US006688798B2

United States Patent
McDevitt

(10) Patent No.: US 6,688,798 B2
(45) Date of Patent: Feb. 10, 2004

(54) ADJUSTABLE LOCKING MOUNT AND METHODS OF USE

(75) Inventor: Dennis McDevitt, Raleigh, NC (US)

(73) Assignee: IncuMed, Inc., Raleigh, NC (US)

( * ) Notice: Subject to any disclaimer, the term of this patent is extended or adjusted under 35 U.S.C. 154(b) by 0 days.

(21) Appl. No.: 10/041,707

(22) Filed: Jan. 8, 2002

(65) Prior Publication Data

US 2002/0116789 A1 Aug. 29, 2002

Related U.S. Application Data

(60) Provisional application No. 60/271,895, filed on Feb. 27, 2001.

(51) Int. Cl.[7] .................................................. B62L 1/12
(52) U.S. Cl. ..................... 403/123; 403/131; 403/374.2; 403/84
(58) Field of Search ............................. 403/83, 84, 90, 403/85, 86, 91, 112, 113, 122, 127, 52, 123, 373, 131, 374.1, 374.2

(56) References Cited

U.S. PATENT DOCUMENTS

| 362,384 A | 5/1887 | Johnson |
| 1,446,164 A | 2/1923 | D'Eyraud |
| 1,538,340 A | 5/1925 | La Hodny |
| 4,051,924 A | 10/1977 | Yoshigai |
| 4,475,314 A | * 10/1984 | Faix et al. ............... 403/90 |
| 4,669,766 A | 6/1987 | Hanchett, Jr. et al. |
| 4,722,502 A | 2/1988 | Mueller et al. |
| 5,195,710 A | 3/1993 | Remblier |
| 5,425,782 A | 6/1995 | Phillips |
| 5,562,737 A | 10/1996 | Graf |
| 5,623,742 A | * 4/1997 | Journee et al. ............... 403/83 |
| 5,723,018 A | 3/1998 | Cyprien et al. |
| 5,725,597 A | 3/1998 | Hwang |
| 5,727,569 A | 3/1998 | Benetti et al. |
| 5,895,428 A | 4/1999 | Berry |
| 5,921,695 A | * 7/1999 | Warner ..................... 403/84 |
| 6,083,263 A | 7/2000 | Draenert et al. |
| 6,123,706 A | 9/2000 | Lange |
| 6,171,039 B1 | 1/2001 | Seurujarvi |
| 6,197,063 B1 | 3/2001 | Dews |
| 6,228,120 B1 | 5/2001 | Leonard et al. |
| 6,241,730 B1 | 6/2001 | Alby |
| 6,248,132 B1 | 6/2001 | Harris |
| 6,273,390 B1 | * 8/2001 | Meyer ..................... 248/507 |
| 6,302,887 B1 | 10/2001 | Spranza et al. |

FOREIGN PATENT DOCUMENTS

| EP | 0 791 330 | 8/1997 |
| EP | 0 920 835 | 6/1999 |
| WO | WO 98/49947 | 4/1998 |
| WO | WO 98 08468 | 5/1998 |
| WO | WO 99/16367 | 4/1999 |
| WO | WO 00/15119 | 3/2000 |
| WO | WO 01/06909 | 2/2001 |

* cited by examiner

Primary Examiner—John R. Cottingham
(74) Attorney, Agent, or Firm—Ryan Kromholz & Manion, S.C.

(57) ABSTRACT

An adjustable locking mount system permits rotation about at least one of x, y, and z axes. Methods provide for rotating and rocking the mount to obtain the desired position, fixing the mount in the desired position, and mounting an object onto the mount.

10 Claims, 17 Drawing Sheets

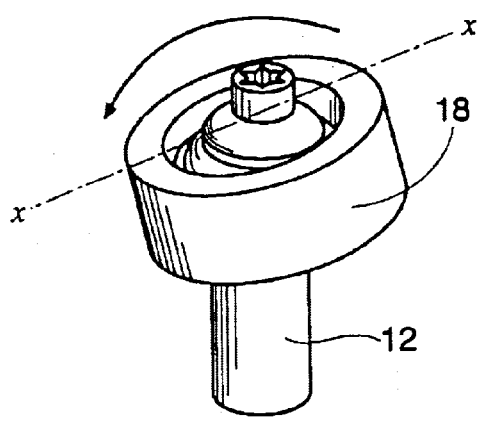
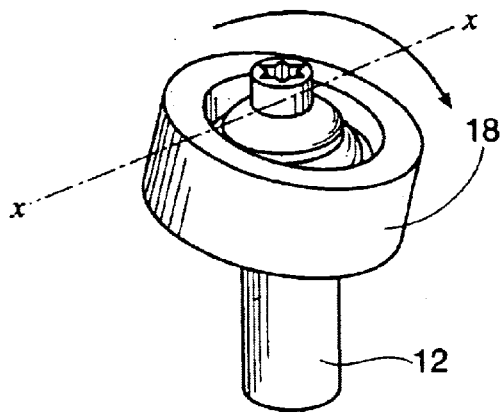
Fig. 4a             Fig. 4b
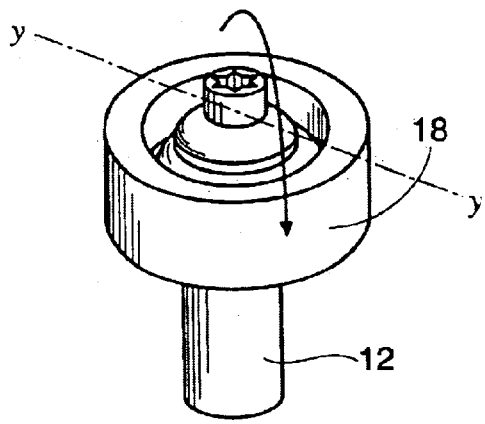
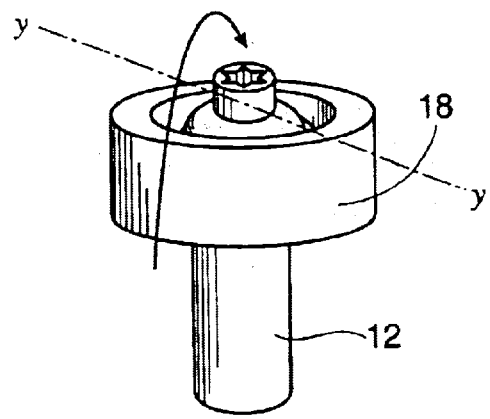
Fig. 4c             Fig. 4d
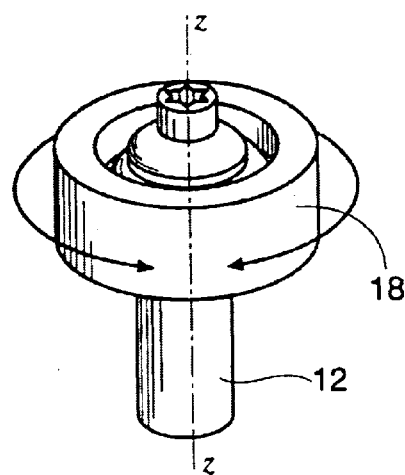
Fig. 4e

ADJUSTABLE LOCKING MOUNT AND METHODS OF USE

This application claims the benefit of provisional U.S. Application Serial No. 60/271,895, filed Feb. 27, 2001, and entitled "Adjustable Head Prosthesis for the Shoulder."

FIELD OF THE INVENTION

This invention generally relates to adjustable mounting devices and related methods.

BACKGROUND OF THE INVENTION

Adjustable mounting devices are commonly employed to mount one object or device onto another object, device, or structure. Typically, the position of the mount needs to be adjusted until the desired position is achieved. The desired position can then be secured by locking the device in the position, e.g., by tightening a screw.

However, conventional adjustable mounts provide a limited range of adjustment. Further, even upon locking the device in a desired position, conventional mounts may not hold the desired position. This is especially true when force is exerted upon the mounted object, e.g., hammering or striking the object to secure it on the mount.

SUMMARY OF THE INVENTION

The invention provides an adjustable mount that permits a wide range of adjustment along or about multiple axes. The invention also provides an adjustable mount that makes possible a straightforward, yet robust way of securing the device in a desired position and maintaining the device in that desired position. The invention is applicable for use in diverse environments, including the medical field.

One aspect of the invention provides an adjustable mount assembly and related methods comprising a mount defining a mounting surface carried by a pivot surface for movement relative to at least one of an x-axis, a y-axis, and a z-axis, where the z-axis is the axis of the pivot surface. The invention further comprises a locking mechanism configured to free the mount for movement and to restrain the mount against movement.

Another aspect of the invention provides an adjustable mount assembly and related methods comprising a mount defining a mounting surface carried for movement relative to a support. The invention further comprises a locking mechanism comprising a series of stacked washers to free the mount for movement and to restrain the mount against movement.

A single mount can be used to mount an object or device in diverse environments, e.g., to mount an audio speaker.

A plurality of mounts can be coupled together along an orientation axis to form an articulated mounting assembly. The orientation axis can be linear or curvilinear. Each mount can have a pivot axis either along or transverse to the orientation axis. A mounting assembly can be used in diverse environments, e.g., to mount a series of objects or devices, such as lights.

Methods provide for rotating or rocking the mount to obtain the desired position. The methods further provide for securing the mount in the desired position and mounting an object on the mount.

Other features and advantages of the inventions are set forth in the following specification and attached drawings.

DESCRIPTION OF THE DRAWINGS

FIGS. 4a–4e illustrate rotational movement of the cooperating components of the assembled system shown in FIG. 2.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims.

I. The Adjustable Locking Mount System

A. System 1:

Interior Hub Centrally Located with Respect to Mounting Surface

Figure 1:
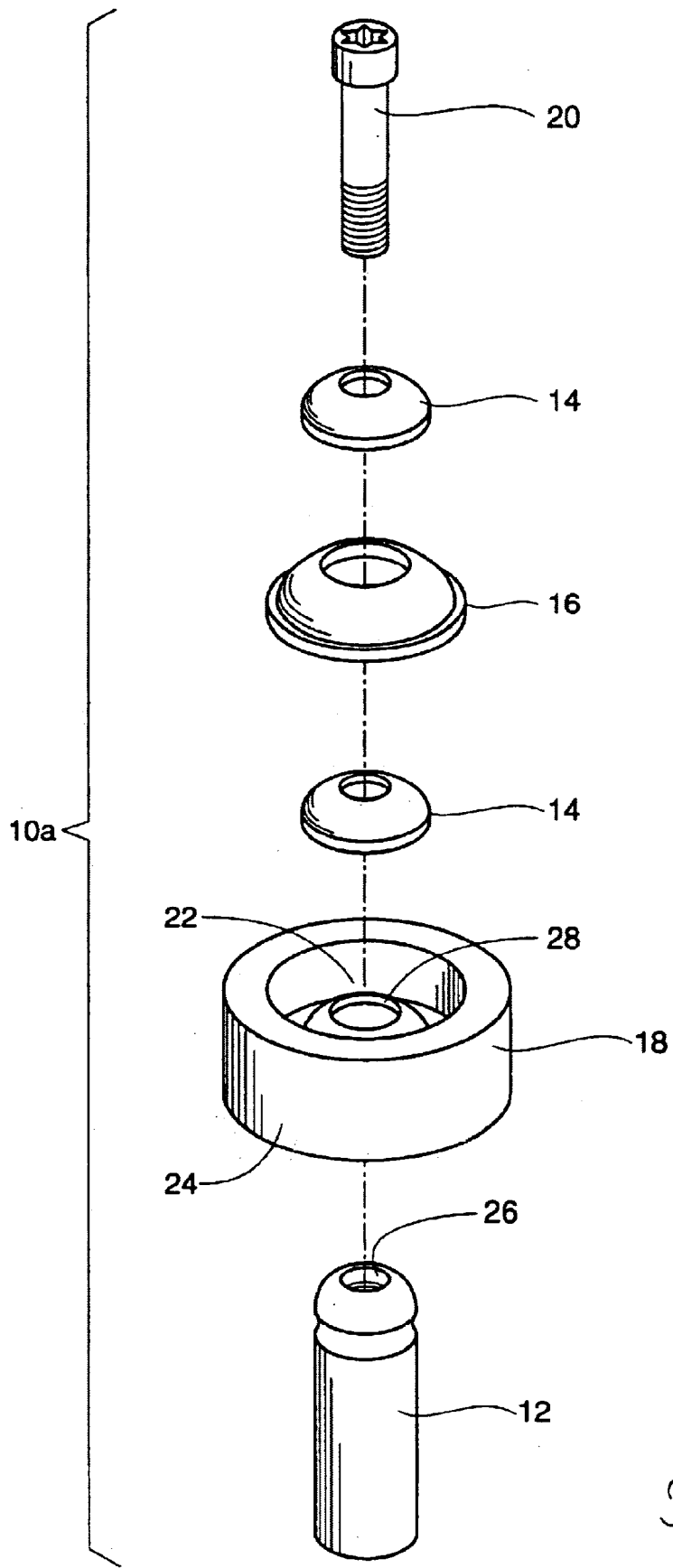
FIG. 1 is an exploded view of the components of an adjustable locking mount system that embodies features of the invention, in which the mounting hub is centric.
Figure 2:
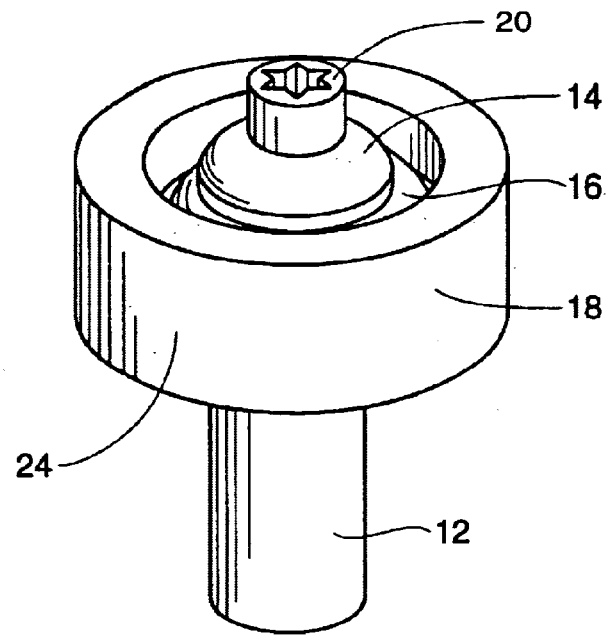
FIG. 2 is an assembled perspective view of the system shown in FIG. 1.
Figure 3A:
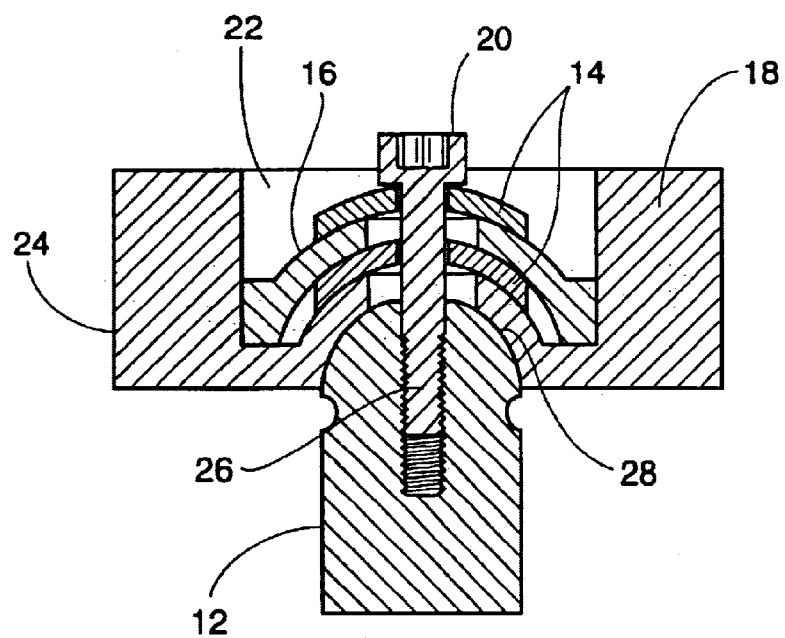
FIG. 3a is a side sectional view of the assembled components of the system shown in FIG. 2.

FIG. 1 shows the individual components of an adjustable locking mounting system 10A. FIGS. 2 and 3a illustrate the system 10A when assembled. As will be described in detail later, the system 10A permits adjustment in three directions or three degrees of freedom (rotational around axes x, y, and z, where the z-axis is represented by the axis of the pivot pin 12) (see FIGS. 4a–4e).

The system 10A comprises the pivot pin 12, at least one slip washer 14, at least one lock washer 16, a mounting hub 18, and a locking screw 20. Each of these components of the system 10A will now be described in detail.

1. System Components

As seen in FIG. 1, the pivot pin 12 is a rigid, generally cylindrical or rod-like member. The pivot pin 12 is convex, e.g., domed, at one end to couple with the mounting hub 18 (see, e.g., FIG. 3a). In a representative embodiment, the arc of curvature is 0.400" diameter (0.200" radius).

In particular, the convex arrangement permits adjustment of the mounting hub 18 by swinging or tilting across the axis of the pivot pin 12 (i.e., rotation about the x-axis and y-axis) as well as by rotating or twisting about the axis of the pivot pin 12 (i.e., rotation about the z-axis) (see FIGS. 4a–4e).

As best seen in FIGS. 1 and 3, the pivot pin 12 has a threaded central bore 26 that serves to receive the locking screw 20. Thus, the pivot pin 12 serves to receive both the mounting hub 18 and the locking screw 20 (see FIG. 3a).

The pivot pin 12 can be made of suitable metal, plastic, or ceramic materials and formed by conventional molding or machining techniques.

As shown in FIG. 1, the mounting hub 18 is a rigid member comprising a mounting surface 24, an interior hub 22, and an exterior pivot surface 28. The center of the mounting hub 18 serves to receive the locking screw 20.

The mounting surface 24 is configured to mate with an object or device being mounted on the hub and therefore can take on a variety of shapes. Thus, the mounting hub 18 serves as a base for mounting of another object or device. For example, the mounting surface 24 can be circular or geometric. In the illustrated embodiment, the mounting surface 24 is generally circular.

Additionally, the mounting surface 24 can be stepped to further aid in positioning and securing the object or device on the mounting surface 24 (not shown). In this arrangement, the object or device being mounted would have a complementary stepped surface. The stepped surface provides greater control of any adjustment by permitting adjustment to be in uniform increments and reducing the risk of inadvertent movement. The mounting surface 24 could alternatively be a threaded surface to facilitate engagement with a mating part.

As best illustrated in FIG. 1, the interior hub 22 is open. The bottom surface of the interior hub 22 is configured to conform to the shape of the convex end of the pivot pin 12 and sized to receive the slip washer(s) 14 and lock washer(s) 16. That is, the interior hub 22 permits a slip washer 14 and lock washer 16, or multiple slip washers 14 and lock washers 16, to be alternately stacked upon one another (see FIG. 3a).

As shown in FIGS. 1–3a, the exterior pivot surface 28 of the mounting hub 18 is configured to nest on and to conform to the convex end of the pivot pin 12, thus permitting a wider range of motion, as previously described.

As best seen in FIG. 3a, the exterior pivot surface 28 is located centrally with respect to the interior hub 22. Further, the interior hub 22 is centrally located with respect to the mounting surface 24, such that the geometric center of the mounting hub 18 coincides with the center of rotation of the mounting hub 18 about the pivot pin 12.

The mounting hub 18 serves to engage and pivot about the pivot pin 12, thus permitting adjustment of the position of the mounting hub 18 with respect to the pivot pin 12, as will be described later. Upon obtaining the desired position, the position of the mounting hub 18 can be locked by use of the locking screw 20, as will also be described in greater detail later.

The mounting hub 18 can be made of any suitable metal or plastic and formed by conventional machining or molding techniques.

As shown in FIG. 1, the system 10A also provides at least one slip washer 14. The slip washer 14 is preferably a rigid annular ring or doughnut-like member. As FIGS. 1 and 3a best show, the slip washer 14 is configured to conform to the bottom surface of the interior hub 22.

The center of the slip washer 14 serves to receive the locking screw 20. The center of the slip washer 14 is of a diameter only slightly larger than the outside diameter of the locking screw 20. The slip washer 14 also serves to provide a frictional surface, which upon tightening of the locking screw 20, serves to further secure the mounting hub 18 in a desired position.

Figure 5A:
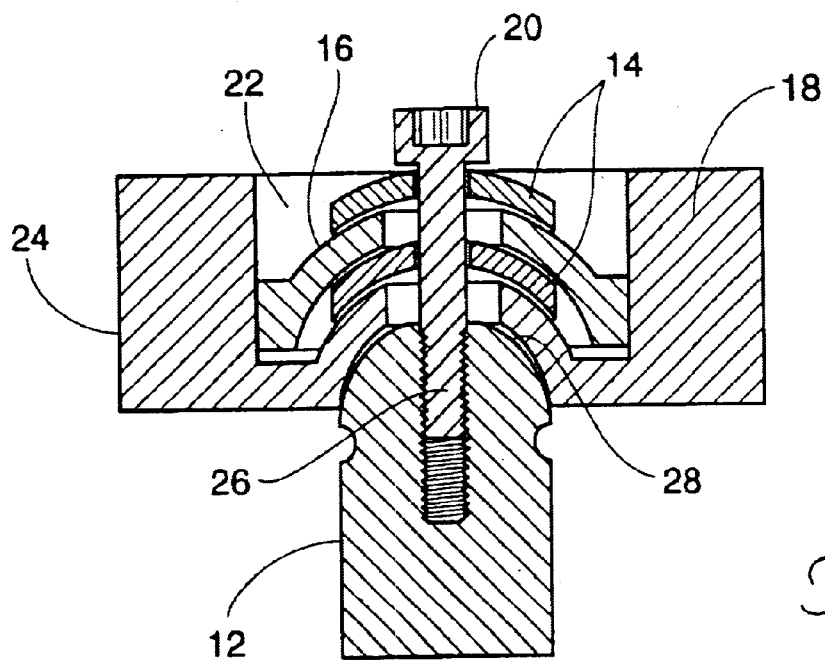
FIG. 5a is a side sectional view of the assembled components of the system shown in FIG. 3 and illustrating the system components in a level position.
Figure 5B:
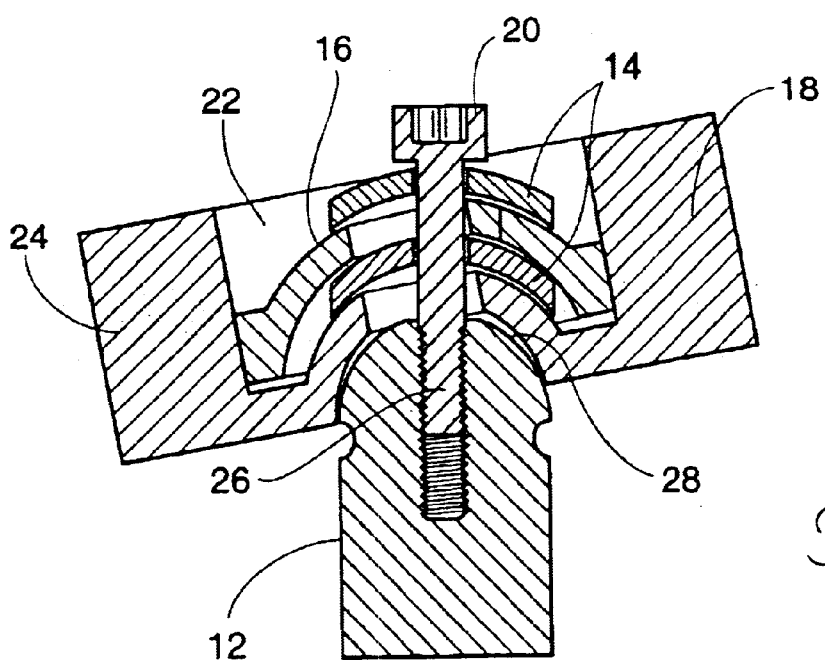
FIG. 5b is a sectional view as shown in FIG. 5a, illustrating the position of the system components and the movement of the mounting hub and lock washer when the mounting hub is rotated about the x or y axis.

The slip washer 14 permits the lock washer 16 to slide across the surface of the slip washer 14 (see FIGS. 5a and 5b). The slip washer 14 is similar in function yet physically different in top and bottom spherical radii from the lock washer 16.

Figure 3B:
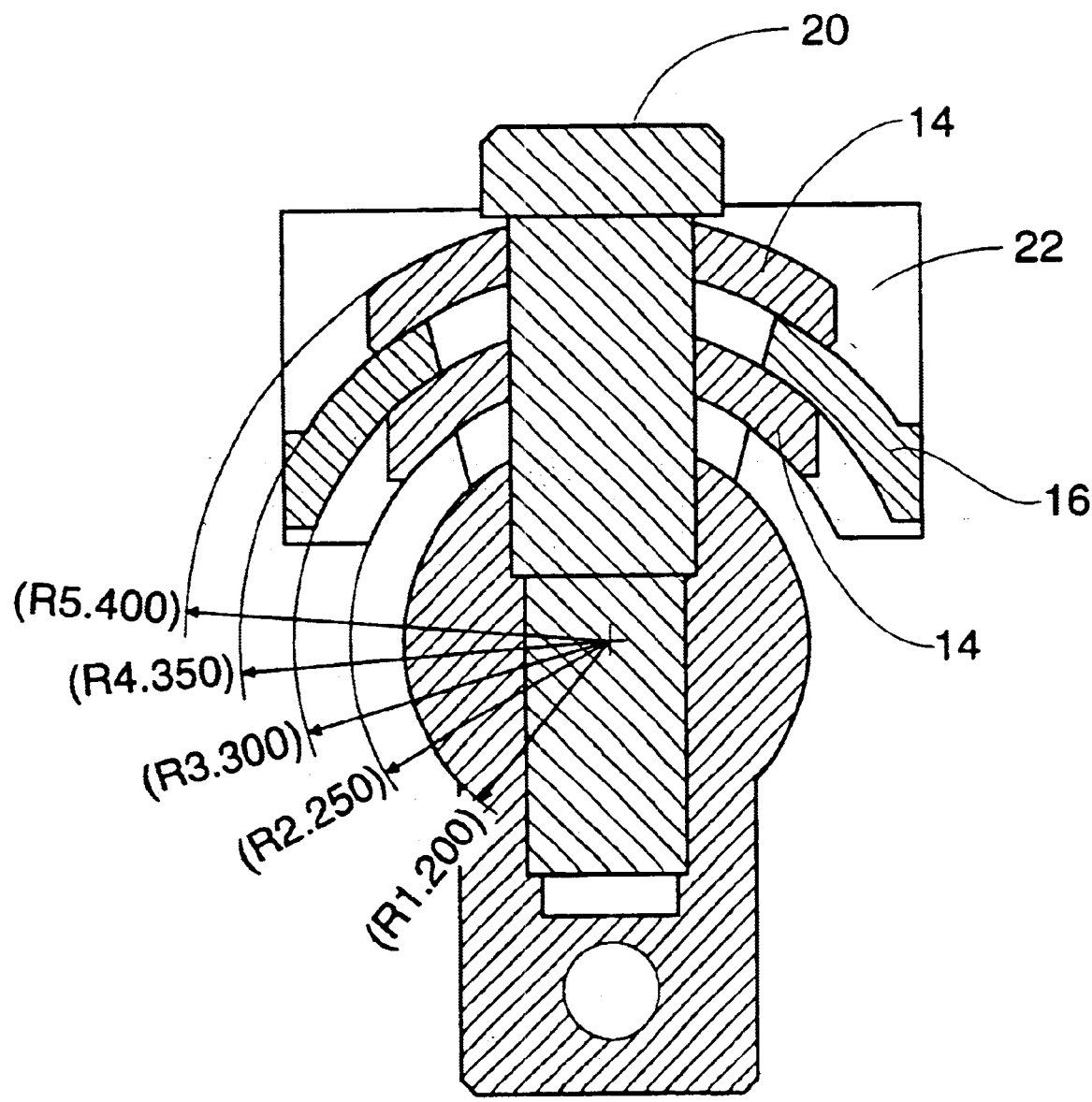
FIG. 3b is a view similar to FIG. 3a and illustrating the spherical radii of the stacked washers.

As seen in FIG. 3b, additional washers 14 and 16 in the assembly would also have different spherical radii, represented by R1–R5 in FIG. 3b, as they are stacked further from the center of rotation or pivot point on the pivot pin 12. In a representative embodiment, R1 is 0.200, R2 is 0.250, R3 is 0.300, R4 is 0.350, and R5 is 0.400.

The radii of the washers 14 and 16 can be varied to accommodate the thickness of the individual washers 14 and 16. Regardless of the thickness or radii of the washers 14 and 16, the washers 14 and 16 are configured to rotate about the same pivot point.

Desirably, as illustrated in FIGS. 1 and 3a, a second slip washer 14, similar in function but differing in spherical radii from the first slip washer 14 is placed over the lock washer 16. As illustrated in FIGS. 5a and 5b, the lock washer 16 is able to slide between the slip washers 14.

In this arrangement, the second slip washer 14 provides an additional frictional surface, which upon tightening of the locking screw 20, serves to further secure the desired position.

The slip washer(s) 14 can be made of any suitable metal or plastic and formed by conventional machining or molding techniques.

As also seen in FIG. 1, the system 10A further provides a lock washer 16. The lock washer 16 is a rigid, annular ring or doughnut-like member similar to the slip washer 14.

As FIGS. 1 and 3a best illustrate, the lock washer 16 is configured to conform to the surface of the slip washer 14. This arrangement permits the lock washer 16 to be stacked on top of the slip washer 14.

As in the case of the slip washer 14, the center of the lock washer 16 serves to receive the locking screw 20. The center of the lock washer 16 is also sized larger than the center of the slip washer 14. That is, the center of the lock washer 16 not only serves to receive the locking screw 20, but also permits the lock washer 16 to pivot about the pivot pin 12.

The lock washer 16 also provides two additional frictional surfaces when sandwiched between two slip washers 14, which upon tightening of the locking screw 20, serve to further secure the desired position.

As also seen in FIGS. 1 and 3a, the lock washer 16 is of a larger diameter than the slip washer 14. This arrangement allows the lock washer 16 to fit over the slip washer 14. In a representative embodiment, the lock washer 16 is sized to approximate or be slightly less than the diameter of the interior hub 22, thereby providing a secure fit of the lock washer 16 within the interior hub 22 and allowing only minimal translation in the x and y axes, yet not restricting z-axis translation of the lock washer 16 within the interior hub 22 and with respect to the axis of the pivot pin 12, as will later be described in detail.

This arrangement secures/couples the lock washer 16 to the interior hub 22 and permits the lock washer 16 to slide with the mounting hub 18 over the slip washer 14 (see, e.g., FIGS. 5a and 5b). Thus, the lock washer 16 serves to provide an additional rotational and rocking surface for the mounting hub 18.

Like the slip washer 14, the lock washer 16 can be made of any suitable plastic or metal and formed by conventional molding or machining techniques.

Desirably, as previously noted, a second slip washer 14 similar in function but differing in spherical radii from the first slip washer 14 can be provided. In this arrangement, as seen in FIGS. 1 and 3a, the lock washer 16 also serves to receive the second slip washer 14. It will be apparent that any number of slip washers 14 and lock washers 16 can be similarly alternately stacked upon each other and thereby accommodate variations in the depth of the interior hub 22.

As also shown in FIG. 1, the system 10A provides a locking screw 20. The locking screw 20 is a screw that is adapted for passage through the mounting hub 18, the slip washer(s) 14, the lock washer(s) 16, and the pivot pin 12 when the system is assembled (see FIG. 3a). In inside the diameter of the slip washer 14 is sized to approximate or be slightly larger than the diameter of the locking screw 20. This arrangement secures/couples the slip washer 14 to the locking screw 20 and the pivot pin 12.

Figure 5C:
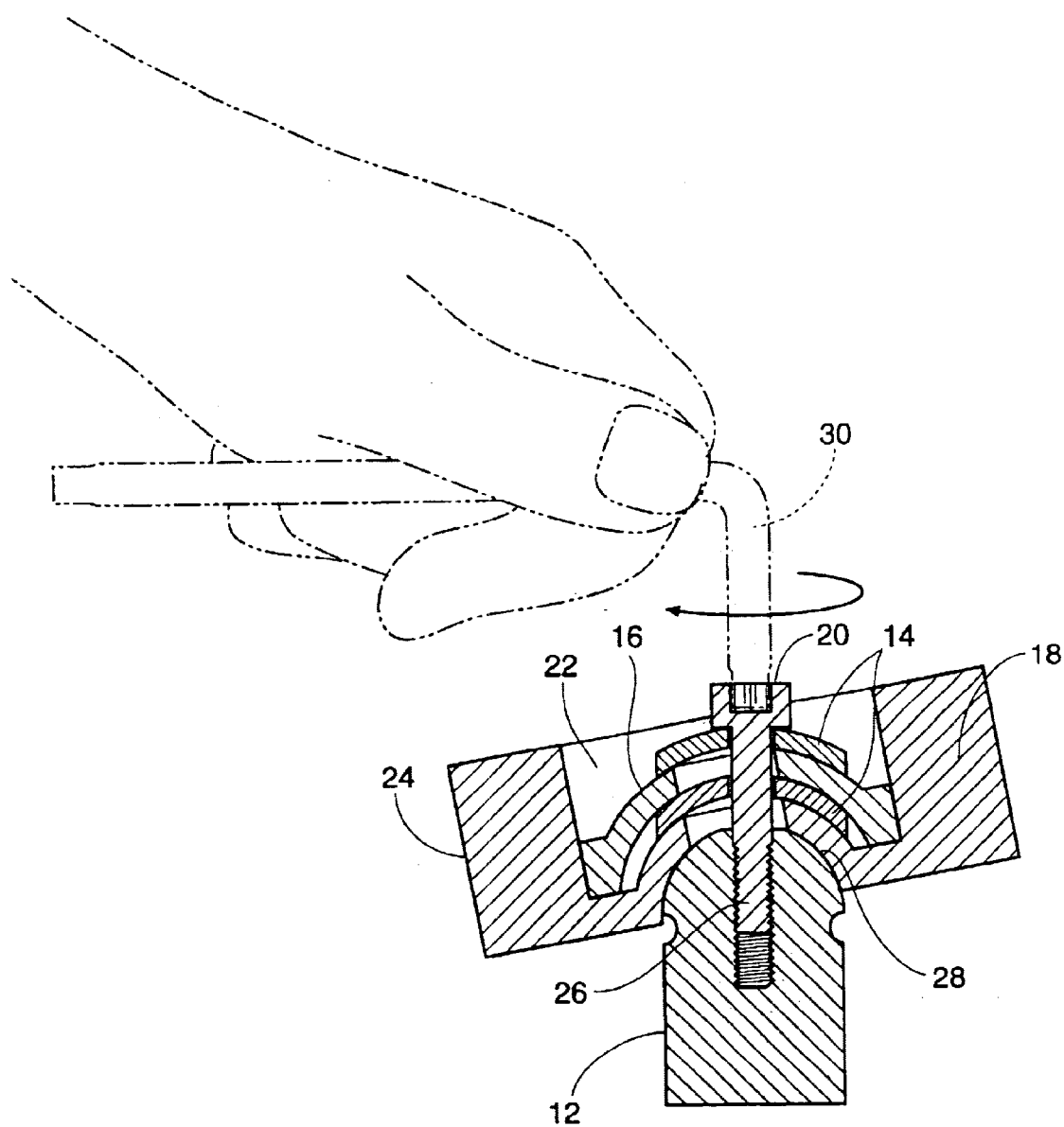
FIG. 5c is a sectional view as shown in FIG. 5b, illustrating the procedure of locking the system in a desired position.

As illustrated in FIG. 3a, the locking screw 20 is desirably threaded to fit the threaded bore 26 of the pivot pin 12. As FIG. 5c illustrates, rotation (represented by arrow in FIG. 5c) of the screw 20, e.g., by an Allen wrench 30, advances the screw into the pivot pin 12 to fix the mounting hub 18 in a desired position. The locking screw 20 can be made of any suitable plastic or metal and formed by conventional molding or machining techniques.

The locking screw 20, when not fully tightened, serves to hold the assembly while the desired position is determined. Tightening of the locking screw 20 compresses the washers 14 and 16, hub 18, and pin 12 together, thereby creating multiple frictional forces between the mating surfaces. These frictional forces and the compression of the screw 20 are what limit movement in the locked position.

It will be apparent that the components just described can be used in any combination. For example, plastic slip washers 14 may be alternated with metal lock washers 16.

2. Adjustment of the Orientation of the Mounting Hub

The system 10A as previously described enables the mounting hub 18 to be oriented in a variety of directions with respect to the pivot pin 12. The types of movement, and thus the types of adjustments permitted, will now be discussed.

The system 10A permits movement of the mounting hub 18 in at least three rotational directions.

First, as represented by arrows in FIGS. 4a–4b, the mounting hub 18 can be rocked or rotated, i.e., tilted, about the x-axis (i.e., side to side rotation). This motion is permitted by the convex surfaces of the pivot pin 12, mounting hub 18, slip washer(s) 14, and lock washer(s) 16.

Second, as represented arrows in FIGS. 4c–4d, the mounting hub 18 can be rocked or rotated, i.e., tilted, about the y-axis (i.e., front to back rotation). This motion is permitted by the convex surfaces of the pivot pin 12, mounting hub 18, slip washer(s) 14, and lock washer(s) 16.

Third, as represented by arrows in FIG. 4e, the mounting hub 18 can be rotated 360° in either a clockwise or counterclockwise direction about the z-axis (i.e., axis of the pivot pin 12).

It is to be understood that the rotational and rocking movements permit adjustment in virtually an infinite number of rotational directions.

B. System 2: Interior Hub Eccentrally Located with Respect to Mounting Surface

1. System Components

Figure 6:
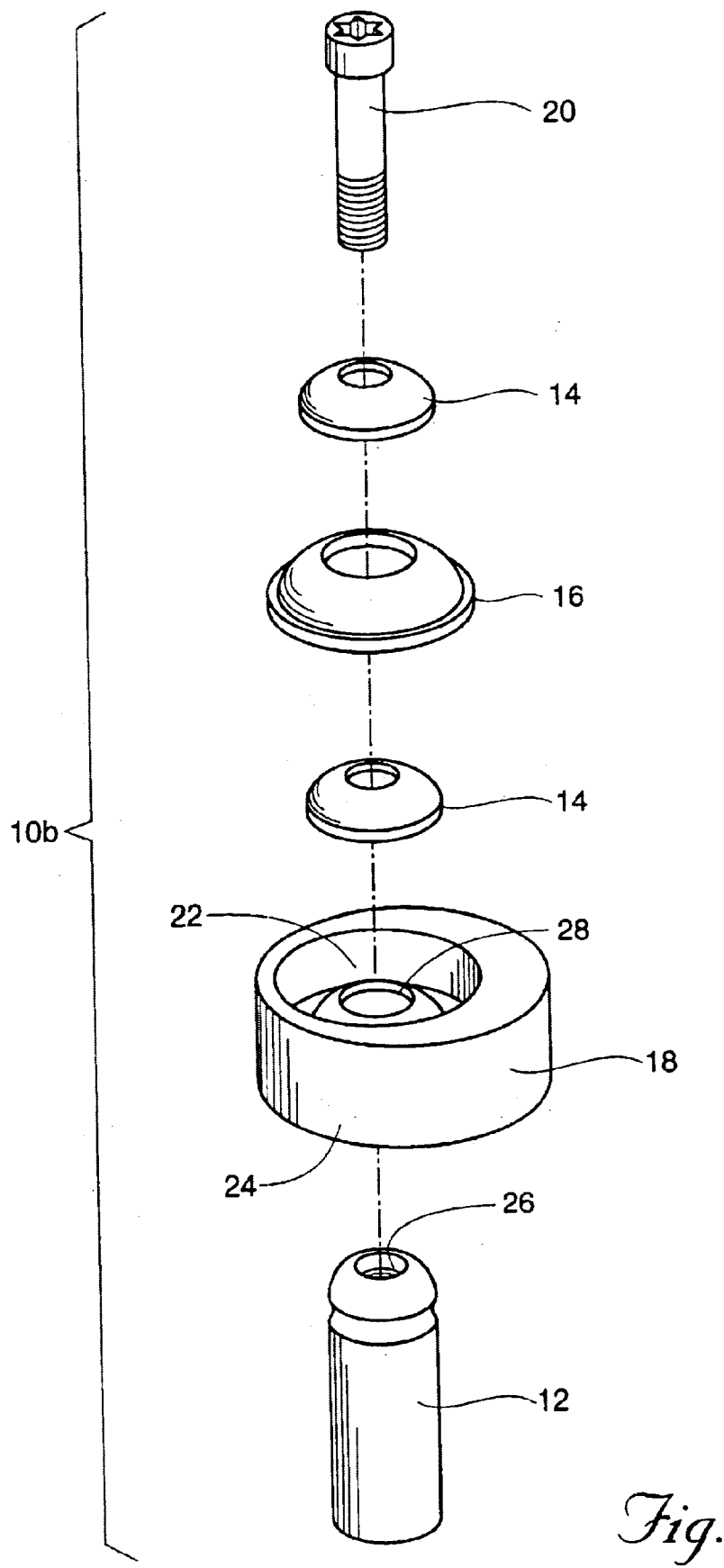
FIG. 6 is an exploded view of the components of an alternative embodiment of an adjustable locking mount system that embodies features of the invention, in which the mounting hub is eccentric.
Figure 7:
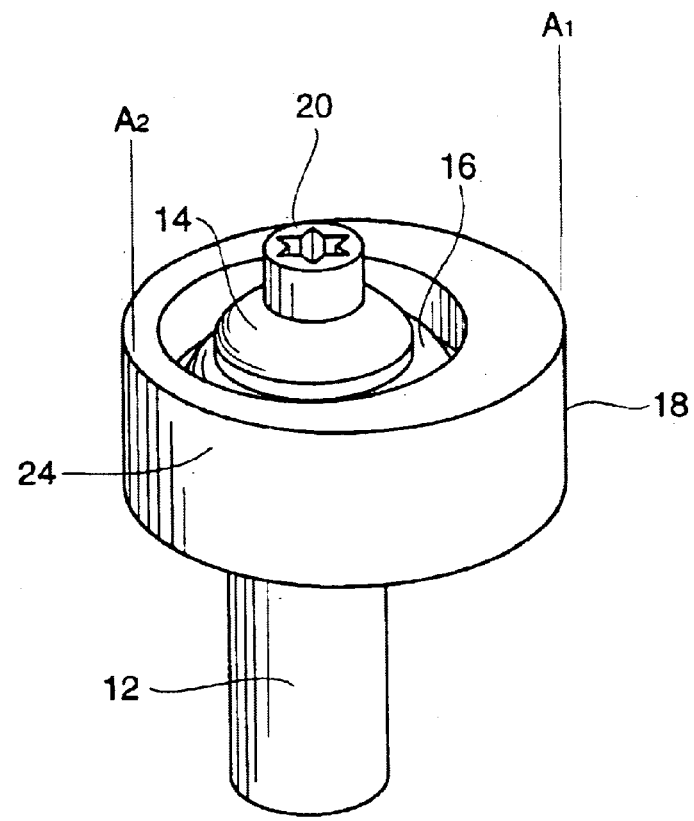
FIG. 7 is an assembled perspective view of the system shown in FIG. 6.
Figure 8:
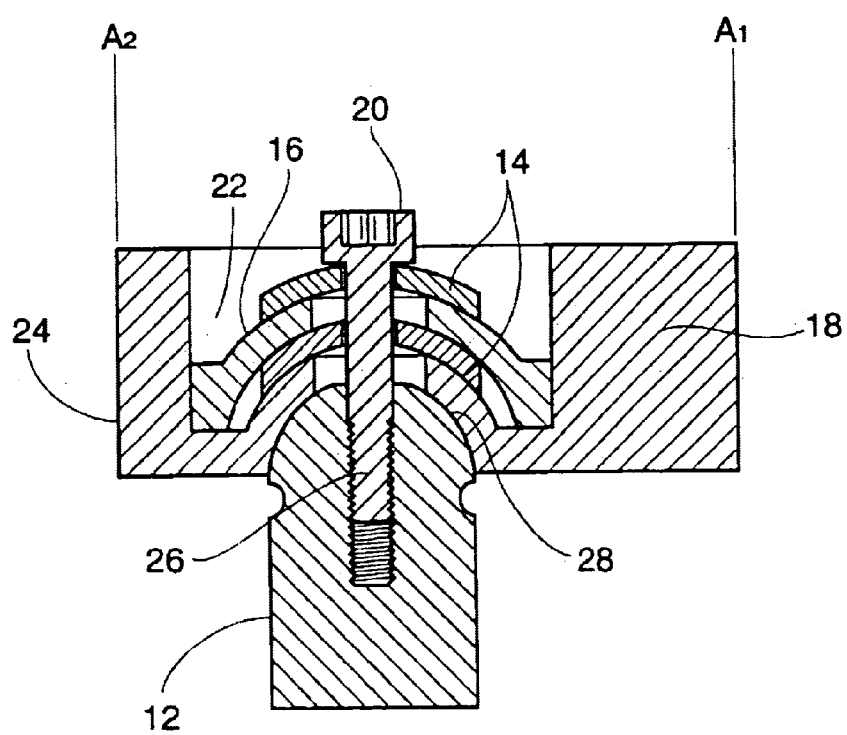
FIG. 8 is side sectional view of the assembled components of the system shown in FIG. 7.

FIG. 6 shows the individual components of an alternative system 10B providing an adjustable locking mount system. FIGS. 7 and 8 illustrate the system 10B when assembled.

Like system 10A, the system 10B comprises a pivot pin 12, at least one slip washer 14, at least one lock washer 16, a mounting hub 18, and a locking screw 20.

Also like system 10A, the mounting hub 18 has an exterior pivot surface 28 that is located centrally with respect to the interior hub 22. In this embodiment, as FIGS. 6–8 best show, the interior hub 22 is eccentric with respect to the mounting surface 24, such that the geometric center of the mounting hub 18 does not coincide with the center of rotation of the mounting hub 18 about the pivot pin 12. The eccentric configuration permits a broader range of adjustment.

2. Adjustment of the Orientation of the Mounting Hub

The system 10B as previously described enables the mounting hub 18 to be oriented in a variety of directions with respect to the pivot pin 12. The types of movement, and thus the types of adjustments permitted, will now be discussed.

The system 10B permits movement of the mounting hub 18 in at least five directions.

Figure 9A:
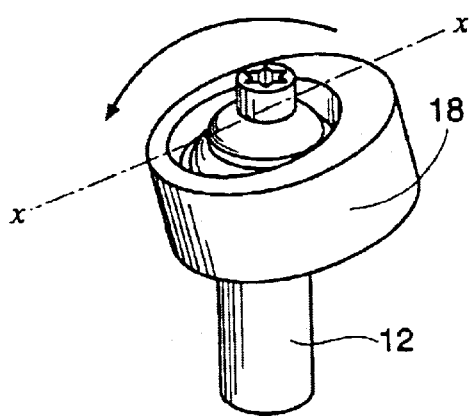
FIGS. 9a–9e illustrate rotational movement of the cooperating components of the assembled system shown in FIG. 7.
Figure 9B:
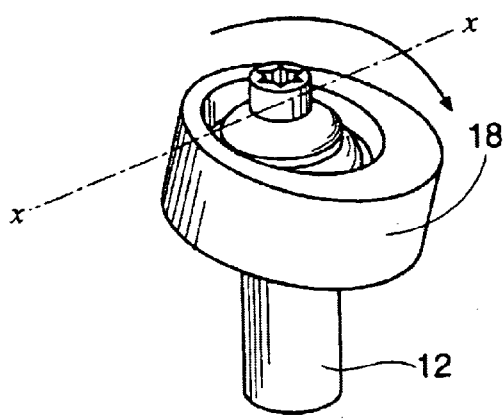

First, as represented by arrows in FIGS. 9a–9b, the mounting hub 18 can be rocked or rotated about the x-axis, as previously described for system 10A.

Figure 9C:
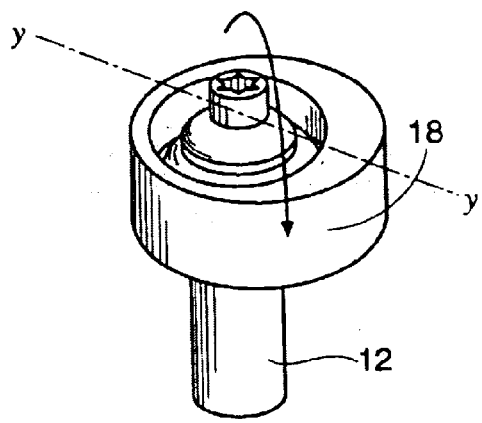
Figure 9D:
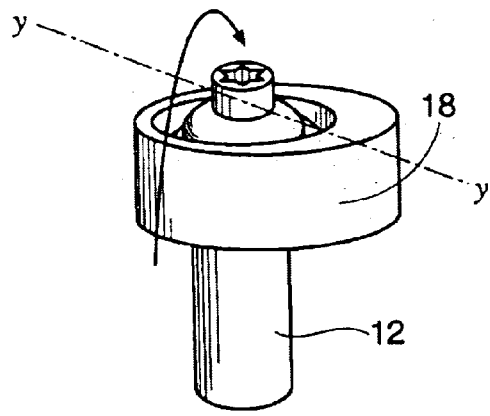

Second, as represented by arrows in FIGS. 9c–9d, the mounting hub 18 can be rocked or rotated about the y-axis, as also previously described for system 10A.

Figure 9E:
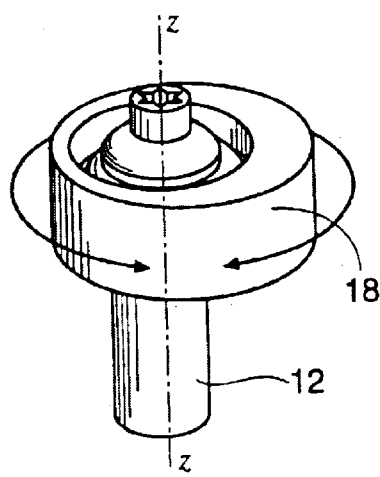

Third, as represented by arrows in FIG. 9e, the mounting hub 18 can be rotated up to 360° in either direction about the z-axis, as previously described for system 10A.

As best illustrated in FIGS. 7 and 8, when the mounting hub 18 includes an interior hub 22 that is eccentric relative to the mounting surface 24, the distance from the pivot pin 12 to the mounting surface 24 increases to a maximum value, depicted as point A1 and then decreases to a minimum value, depicted as point A2.

Reorientation or translation of the linear position of point A1 and point A2 with respect to the pivot pin 12 is possible when the mounting hub 18 is rotated about the z-axis.

Reorientation of points A1 and A2 with respect to the x-axis provides a fourth degree of freedom. Similarly, reorientation of points A1 and A2 with respect to the y-axis provides a fifth degree of freedom.

It is to be understood that the rotational and rocking movements just described permit adjustment in virtually an infinite number of directions.

After the desired position is obtained, the locking screw 20 is tightened to secure the mounting hub 18 in the desired position, as previously described for System 10A (see FIG. 5c).

In some instances, it may be desirable to limit the range of motion or degrees of freedom of the adjustable mount. Two additional systems (System 3 and System 4) that limit the range of motion of the adjustable mount will now be described.

C. System 3:

5-Washer System with Washers Engaged with the Hub and Post to Restrict Rotation about the Z-Axis in the Locked Position.

Figure 10:
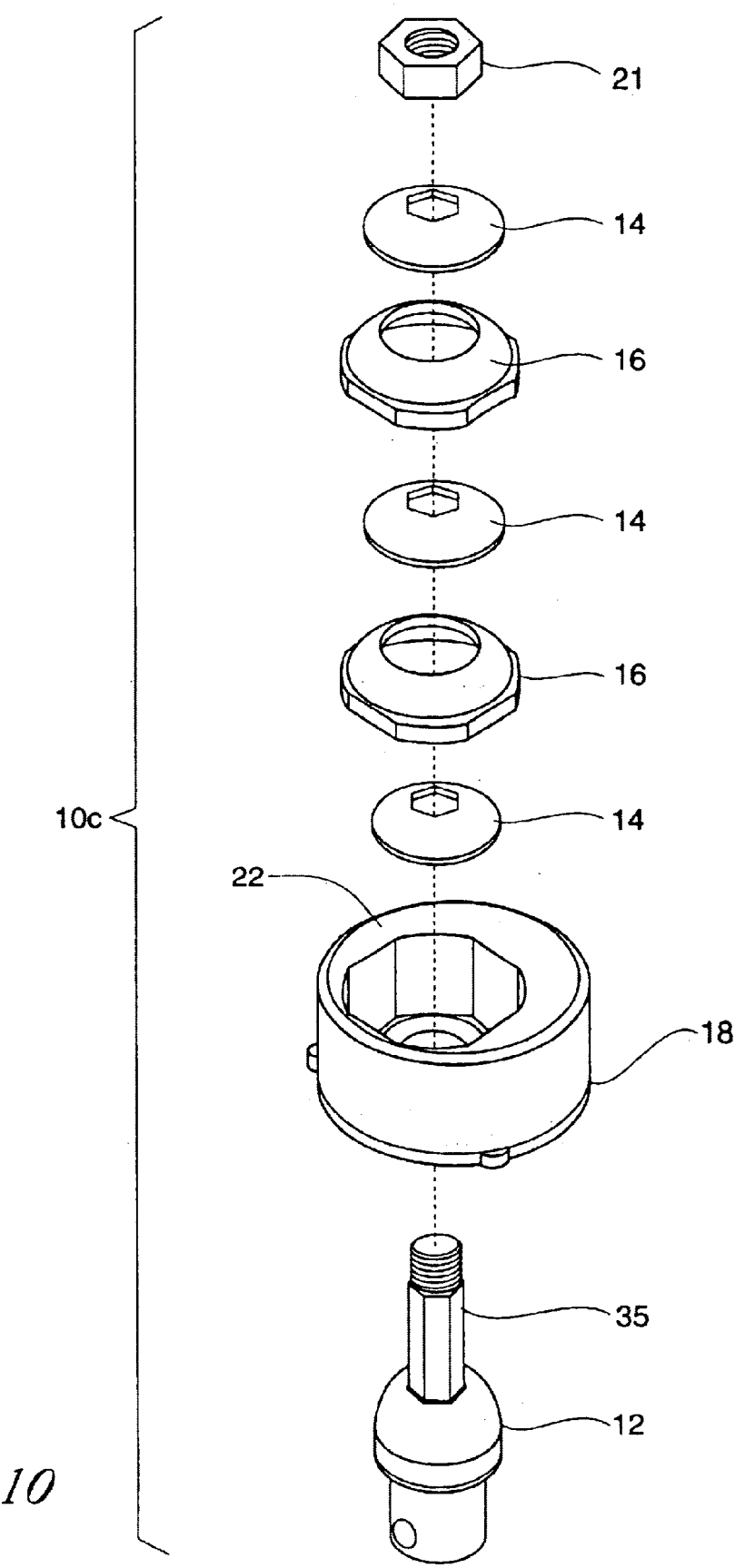
FIG. 10 is an exploded view of the components of an alternative embodiment of an adjustable locking mount system that embodies features of the invention.
Figure 11:
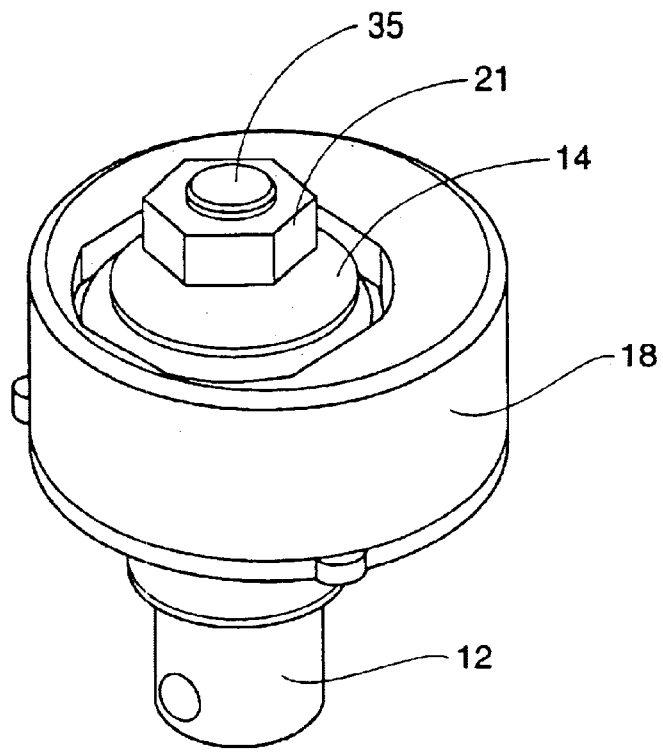
FIG. 11 is an assembled perspective view of assembled components of the system shown in FIG. 10.
Figure 12:
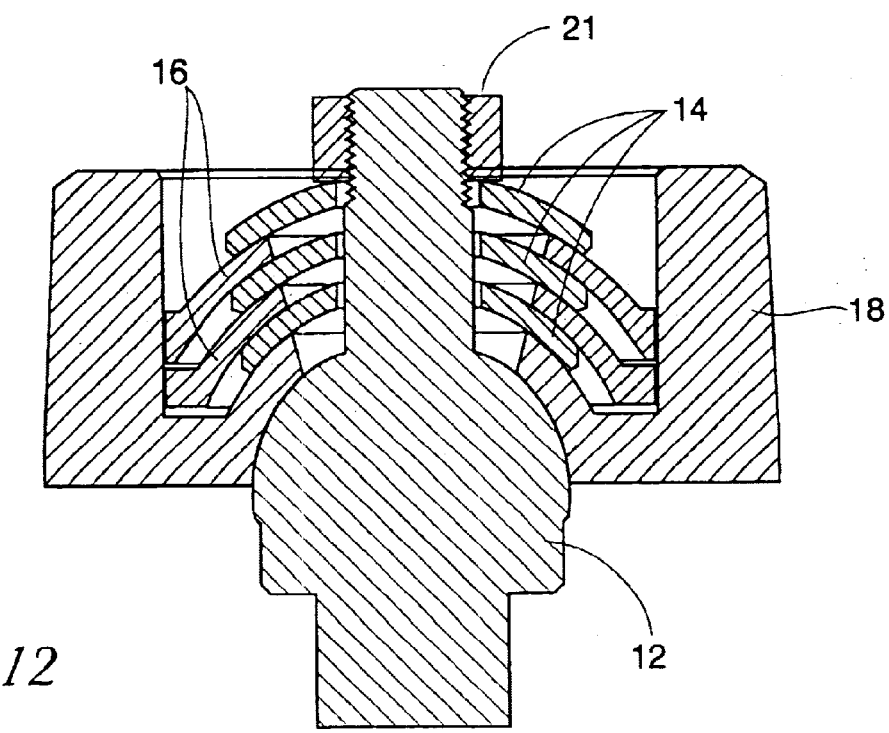
FIG. 12 is side sectional view of the assembled components of the system shown in FIG. 11.

FIG. 10 shows the individual components of an alternative system 10C providing an adjustable locking mount system that restricts rotation about the z-axis when locked. FIGS. 11 and 12 illustrate the system 10C when assembled.

The system 10C comprises a pivot pin 12, three slip washers 14, two lock washers 16, a mounting hub 18, and a fastener 21, e.g., a nut. While the illustrated embodiment depicts a five-washer system, a greater or lesser number of slip washers 14 and lock washers 16 can be provided, as previously described.

As best seen in FIG. 10, the outside surface of lock washer 16 and the inside surface of the interior hub 22 of mounting hub 18 have mating surfaces. This arrangement essentially prevents any rotation between the lock washers 16 and the mounting hub 18.

Additionally, the pivot pin 12 has a post 35 protruding from the top with an outer diameter shaped to mate with a similarly-shaped inner diameter on the slip washers 14 to prevent rotation between the post 35 and the slip washers 14.

For example, in the embodiment illustrated in FIGS. 10–12, the outside surface of the lock washer, the inner surface of the interior hub 22, and the post 35 have complementary hexagonal configurations.

This arrangement permits all degrees of freedom as previously described for systems 10A and 10B, but has additional restriction to movement about the z-axis when in the locked position.

Tightening of the fastener 21 serves to secure the mounting hub 18 in the desired position, as previously described for Systems 10A and 10B.

D. System 4:

Flat Washer System

Figure 13:
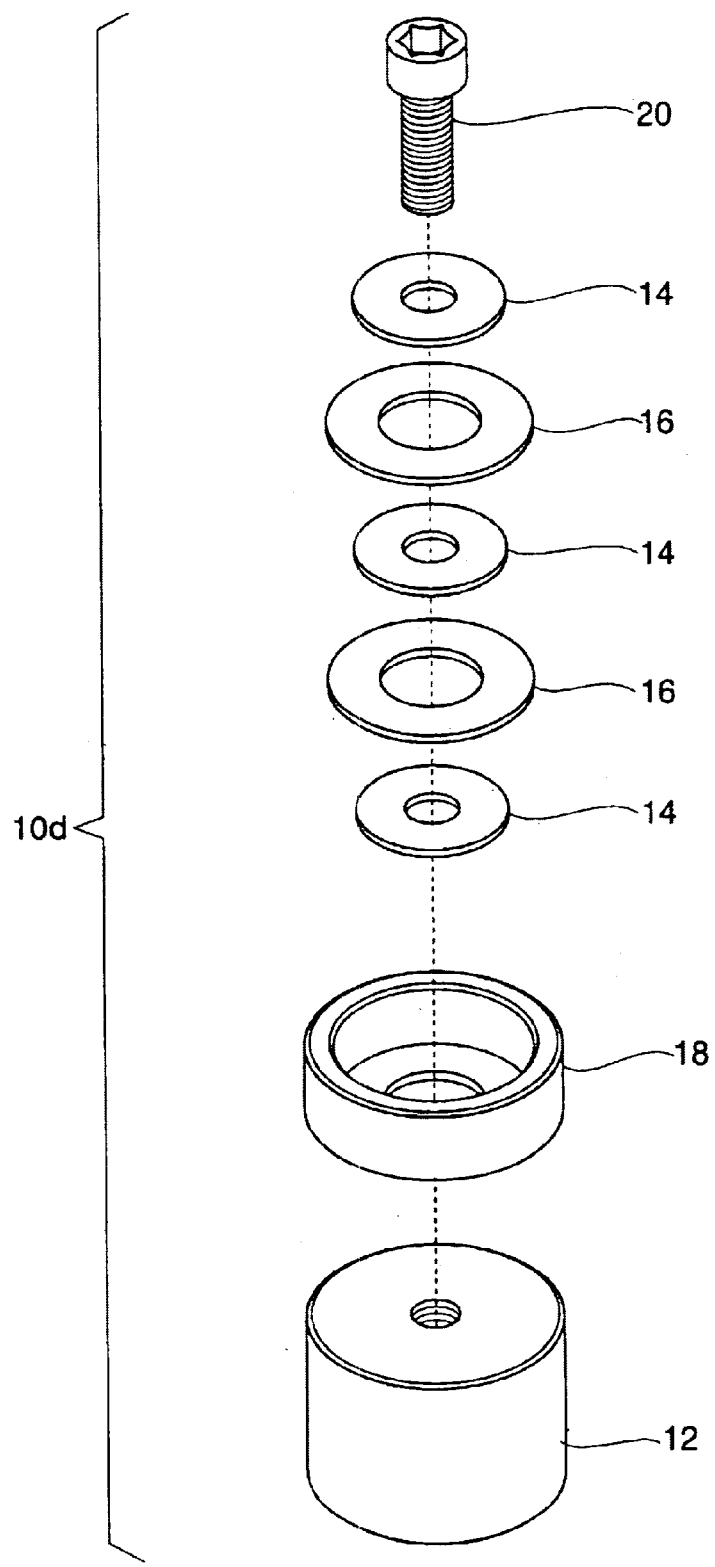
FIG. 13 is an exploded view of an alternative embodiment of an adjustable locking mount system that embodies features of the invention.
Figure 14:
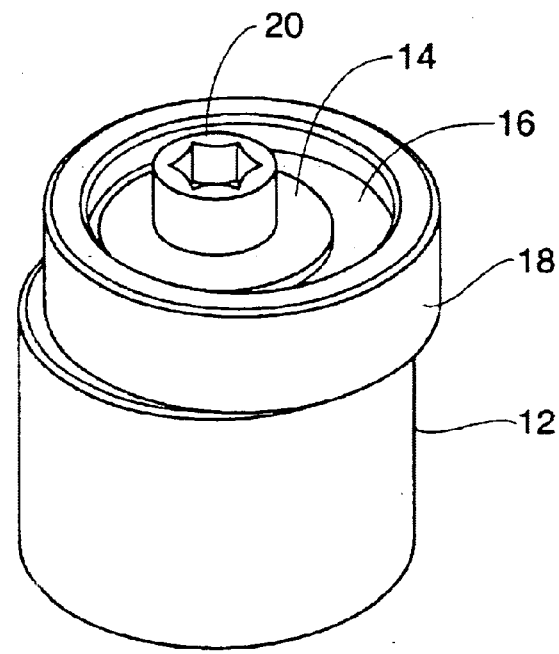
FIG. 14 is an assembled perspective view of the system shown in FIG. 13.
Figure 15:
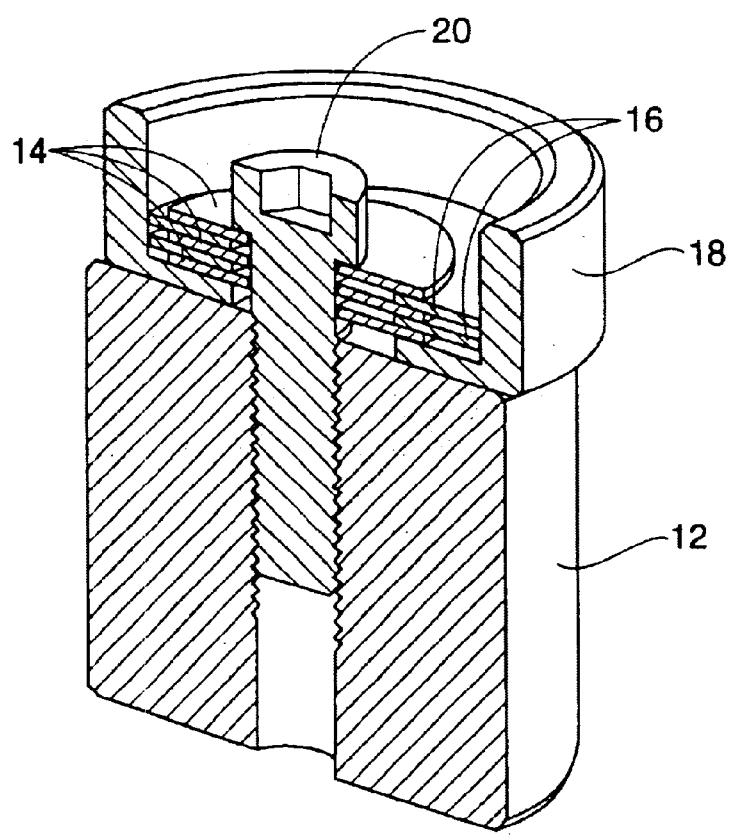
FIG. 15 is side sectional view of the assembled components of the system in FIG. 13.

FIG. 13 shows the individual components of an alternative system 10D providing an adjustable locking mount system that provides rotational movement about the z-axis and linear movement along the x and y axes. FIGS. 14–15 illustrate the system 10D when assembled.

Similar to system 10C, the system 10D comprises a pivot pin 12, three slip washers 14, two lock washers 16, a mounting hub 18, and a locking screw 20. The invention also contemplates embodiments having a greater or lesser number of slip washers 14 and lock washers 16.

In this embodiment, the pivot pin 12, slip washers 14, lock washers 16, and mounting hub 18 each have flat surfaces.

Figure 16A:
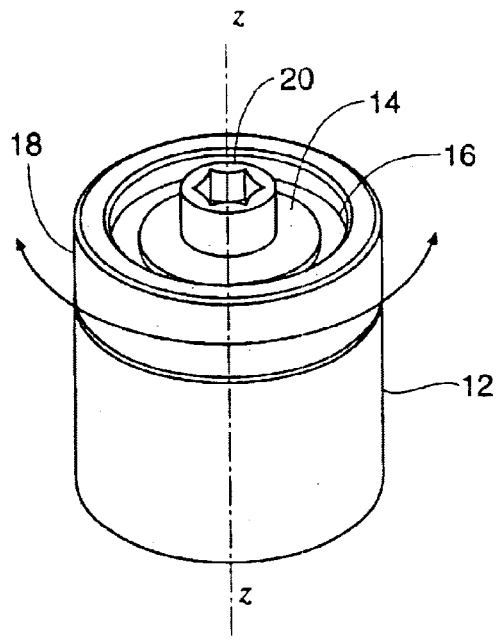
FIGS. 16a–16c illustrate movement of the cooperating parts of the assembled system shown in FIG. 14.

As represented by arrows in FIG. 16a, this arrangement permits 360° rotational movement in either a clockwise or counterclockwise direction about the z-axis (i.e., axis of the pivot pin 12).

Figure 16B:
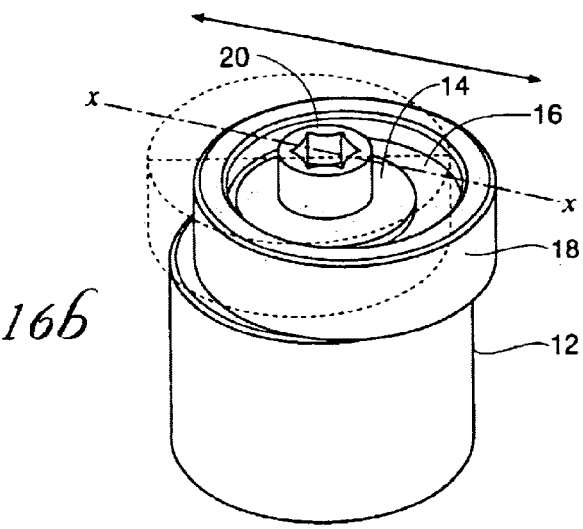
Figure 16C:
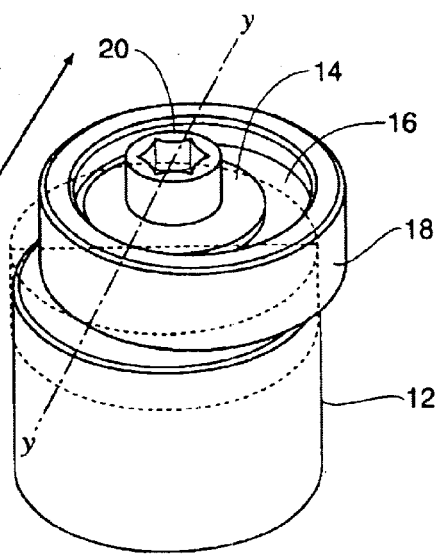

As represented by arrows and phantom lines in FIG. 16b, the mounting hub 18 can also be moved linearly along the x-axis (i.e., side to side translation). The mounting hub 18 can also be moved linearly along the y-axis (i.e., front to back translation), as represented by arrows and phantom lines in FIG. 16c. However, because of the flat surfaces of the pivot pin 12, mounting hub 18, slip washer(s) 14, and lock washer(s) 16, rotational ranges of motion along the x and y axes are essentially prevented.

As represented with the previous embodiments 10A–10C, tightening the screw 20 compresses the washers 14 and 16 together and multiplies the frictional forces between surfaces to restrict motion between the hub 18 and the pivot pin 12.

II. Representative Use of System

A. Composite Mounting Assembly

The adjustable mount of any of the systems 10A–10D just described can be used alone as a single mount. Alternatively, multiple mounts can be coupled together to form a composite mounting assembly. Further, mounts of different systems can be coupled together. For example, a mount of the type of system 10A could be coupled to a mount or mounts of the type of system 10B. It is apparent that any number of mounts can be coupled together.

FIGS. 17a–17d provide examples of three such composite mounting assemblies contemplated by the invention. In the illustrated embodiments, a series of multiple mounting frames 98 each house an adjustable mount having a mounting hub 18, as described for any of the systems 10A–10D. The frames 98 are attached along an orientation axis, designated OA in FIGS. 17a–17d. The orientation axis OA can be linear (see FIGS. 17a, 17b, and 17d) or curvilinear (see FIG. 17c).

Figure 17C:
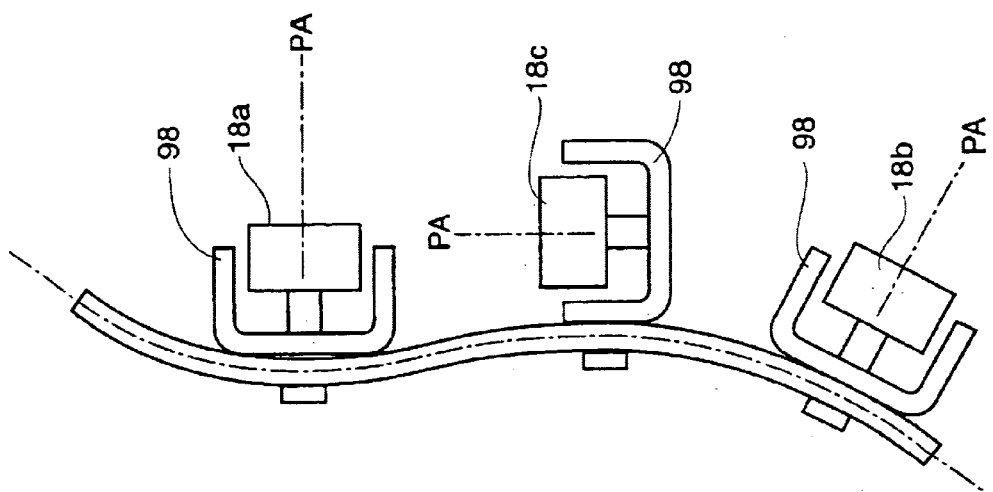
FIGS. 17a–17d illustrate various embodiments of composite mounting assemblies embodying features of the invention.
Figure 17B:
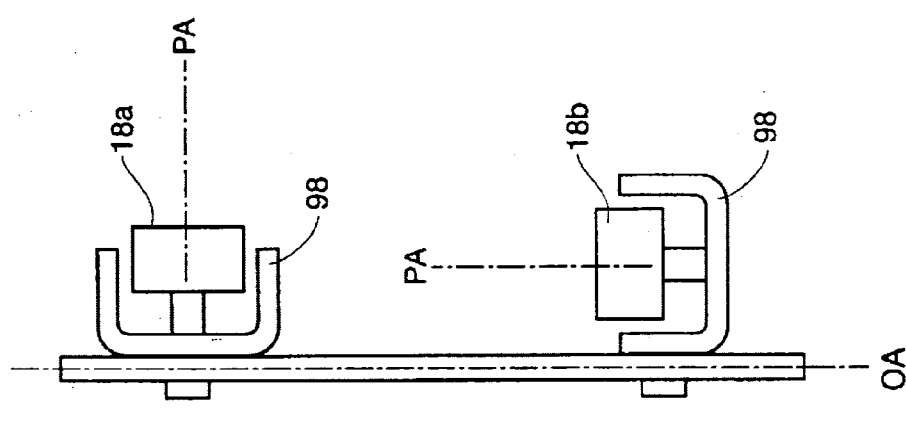
Figure 17A:
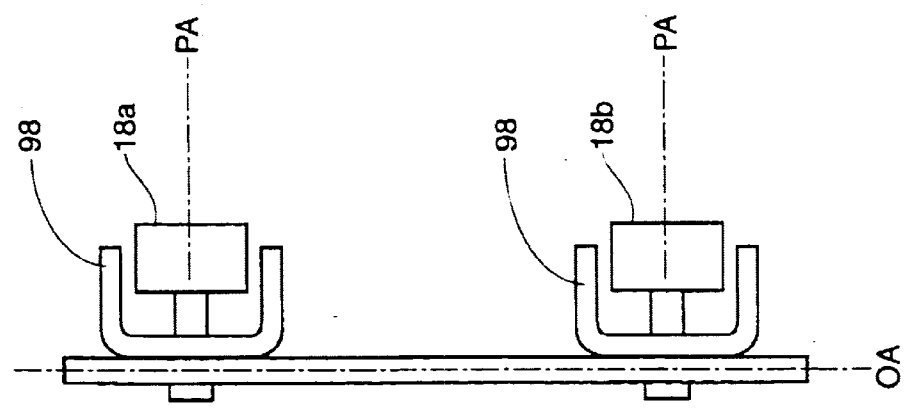
Figure 17D:
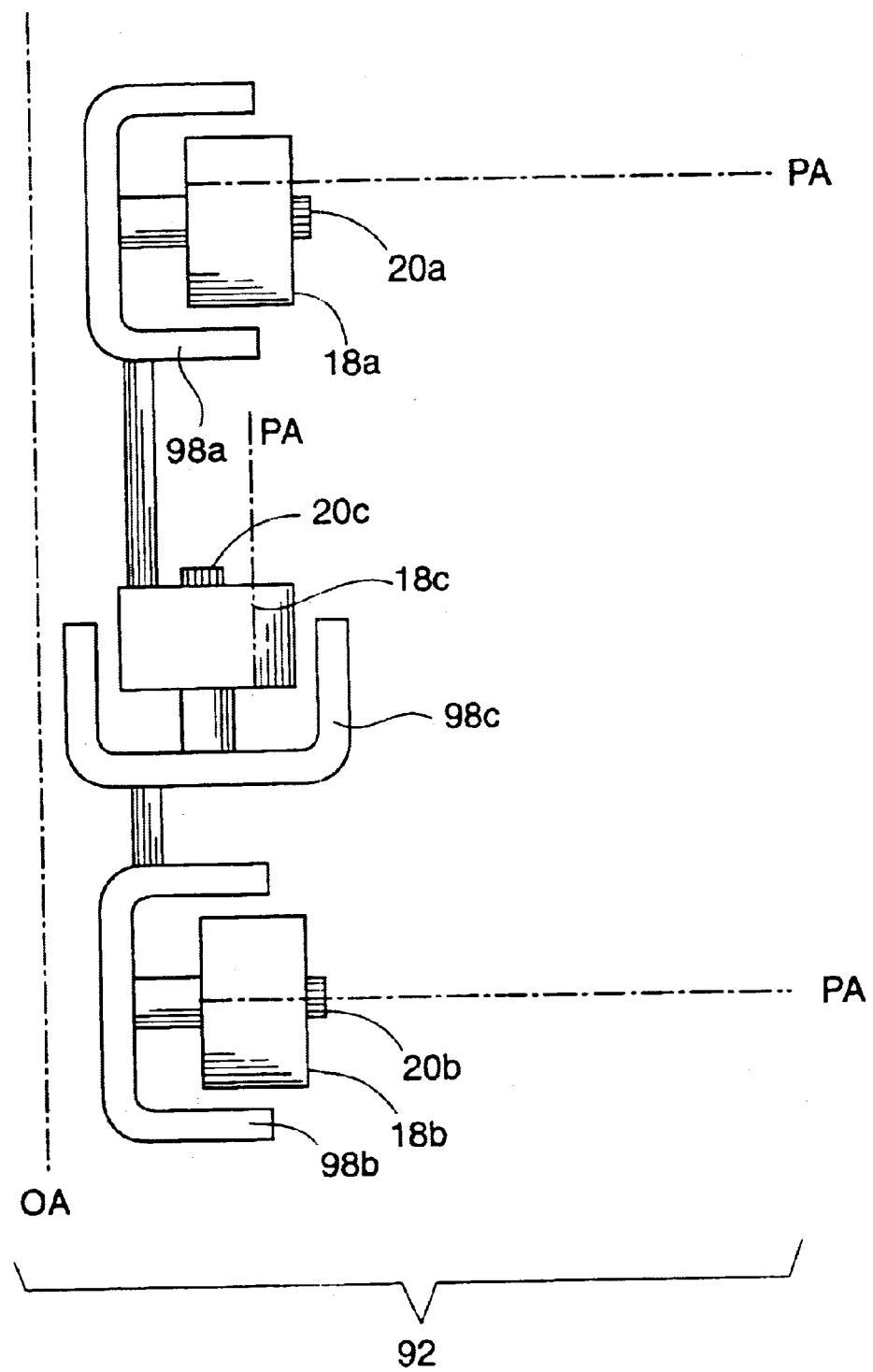

As FIGS. 17a–17d illustrate, adjacent frames 98 can be joined in a fixed relationship by various methods, e.g., fastener, weld, or spacing member. That is, the frames 98 can be coupled side-by-side or in a spaced-apart relationship. In the embodiments shown in FIGS. 17a–17c, a spaced-apart relationship is employed. Alternately, as seen in FIG. 17d, a mounting hub 18 can be joined, either directly or through a spacing member, to an adjacent frame 98.

Each mounting hub 18 has a pivot axis, designated PA in FIGS. 17a–17d. The pivot axis PA can either extend generally along the orientation axis OA or be generally transverse to the orientation axis OA.

FIG. 17a illustrates an arrangement in which first and second mounting hubs 18a and 18b have pivot axes PA generally transverse to the orientation axis OA. In FIG. 17b, mounting hub 18a has a pivot axis PA generally transverse to the orientation axis OA, while mounting hub 18b has a pivot axis PA that generally extends along the orientation axis OA.

FIGS. 17c and 17d show embodiments having first, second, and third mounting hubs 18a, 18b, and 18c. In the embodiments illustrated in FIGS. 17c and 17d, mounting hubs 18a and 18b have pivot axes PA generally transverse to the orientation axis OA, while mounting hub 18c has a pivot axis PA that generally extends along the orientation axis OA.

Any of the systems 10A–10D are suitable for use in mounting an object or device on another object, device, or structure. An illustration of one such use will now be provided. It is to be understood that the following example is merely illustrative and that features of the invention can be employed in an infinite number of circumstances to mount a variety of objects and devices onto various objects, devices, and structures.

B. Mounting of an Object or Device

Figure 18:
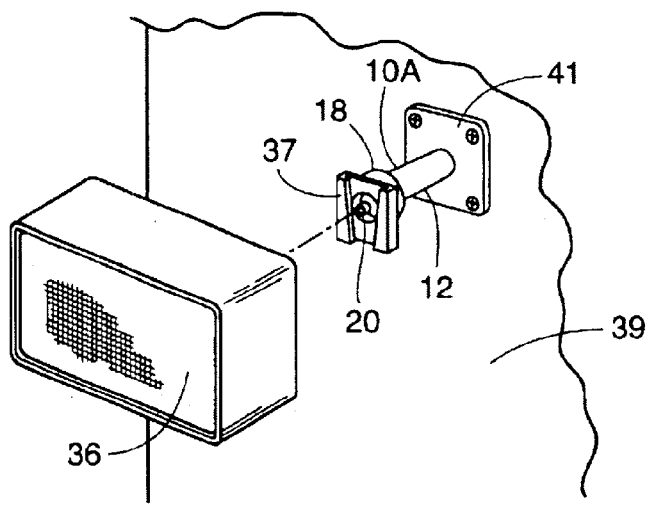
FIG. 18 is a perspective view of a wall, and illustrating an adjustable locking mount that embodies features of the invention mounted onto the wall and further illustrating a stereo speaker to be mounted on the mount.
Figure 19:
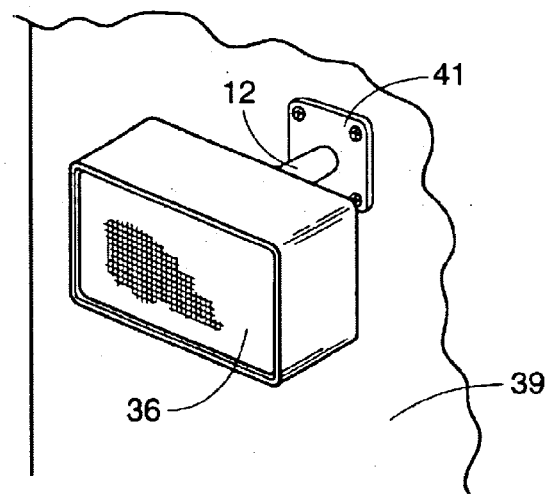
FIG. 19 is view similar to FIG. 18 and illustrating the speaker mounted on the mount.
Figure 20:
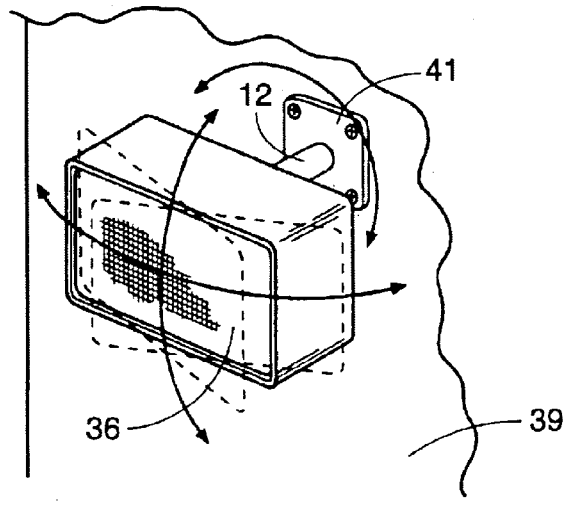
FIG. 20 is a view similar to FIG. 19 and illustrating the position of the speaker being adjusted by rocking and rotational movement.

FIGS. 18–20 detail the use of an adjustable mount of the type described for systems 10A–10D to mount a stereo speaker 36 on a wall 39. In the embodiment illustrated in FIGS. 18–20, the mount of system 10A is employed.

As shown in FIG. 18, the system 10A is first fixed onto a wall 39 using a mounting base 41. In this arrangement, the locking screw 20 is tightened enough to secure the assembled system 10A, but loose enough to permit adjustment of the mounting hub 18. A mounting bracket 37 is then coupled to the mounting hub 18.

Next, as seen in FIG. 19, the stereo speaker 36 is mounted onto the mounting hub 18 using the mounting bracket 37.

Finally, the position of the speaker 36 is adjusted. The position of the speaker 36 is adjusted by a combination of rotational and rocking movement along the x, y, and z axes as permitted until the desired position is obtained, as illustrated by arrows and phantom lines in FIG. 20.

This arrangement permits the position of the speaker 36 to subsequently be selectively adjusted, i.e., does not secure or fix the speaker 36 in a desired position.

In an alternate arrangement, the speaker 36 can be secured in a desired position. In this arrangement, the system 10A is first fixed onto a wall 39, as previously described (see FIG. 18). Then, the position of the mounting hub 18 is adjusted until the desired position is obtained (see, e.g., FIGS. 4a–4e). Next, the desired position is fixed by tightening the locking screw 20 (see FIG. 5c). Finally, the speaker 36 is mounted onto the mounting hub 18, as previously described (see FIG. 19).

This arrangement secures the speaker 36 in a fixed position, i.e., does not permit subsequent selective adjustment of the position of the speaker 36 without release of the locking screw.

In a similar manner, a composite mounting assembly can be employed to mount a series of objects or devices, e.g., track lighting (not shown).

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An adjustable mount assembly for an object comprising a pivot pin including a first contact surface, a mount including a mounting surface for the object, the mount including a first pivot surface mating with the first contact surface for movement of the mount upon the pivot pin, the mount including second, third and fourth pivot surfaces stacked sequentially above the first contact surface, the second and third pivot surfaces facing each other forming a space therebetween, the fourth pivot surface facing away from the third pivot surface, the second, third, and fourth pivot surfaces moving in concert with the mount upon the pivot pin, a first element coupled to the pivot pin in the space between the second and third pivot surfaces, the first element including a second contact surface mating with the second pivot surface and a third contact surface mating with the third pivot surface during movement of the mount upon the pivot pin, a second element coupled to the pivot pin above the fourth pivot surface, the second element including a fourth contact surface mating with the fourth pivot surface during movement of the mount upon the pivot pin, and a locking pin extending through the mount, the first and second elements, and the second, third, and fourth pivot surfaces, and threaded to the pivot pin for rotational movement in a first direction for compressing the first, second, third, and fourth contact surfaces against the first, second, third, and fourth pivot surfaces, respectively, to create multiple concurrent frictional forces at all first, second, third and fourth contact surfaces that limit movement of the mount upon the pivot pin, and in a second direction that relieves the multiple concurrent frictional forces to allow movement of the mount upon the pivot pin.

2. An assembly according to claim 1 wherein the first element comprises a washer.

3. An assembly according to claim 1 wherein the second element comprises a washer.

4. An assembly according to claim 1 wherein the first element comprises a first washer, and wherein the second element comprises a second washer.

5. An assembly according to claim 1 wherein the third and fourth pivot surfaces comprise, respective, lower and upper surfaces of a washer carried by the mount.

6. An assembly according to claim 1 wherein the mount rotates about an axis on the pivot pin.

7. An assembly according to claim 1 wherein the mount tilts about an axis on the pivot pin.

8. An assembly according to claim 1 wherein the mount rotates and tilts about an axis on the pivot pin.

9. An assembly according to claim 1 wherein at least one of the first, second, third, and fourth pivot surfaces is curved along a radius.

10. An assembly according to claim 1 wherein the first pivot surface includes a center about which the first pivot surface is curved, and wherein the second, third, and fourth pivot surfaces are curved at sucessively increasing radii from the center of the first pivot surface.

* * * * *